United States Patent
Grange

(10) Patent No.: US 10,516,287 B2
(45) Date of Patent: Dec. 24, 2019

(54) SYSTEM, METHOD AND APPARATUS FOR SAFE A4WP POLLING

(71) Applicant: Intel Corporation, Santa Clara, CA (US)

(72) Inventor: Dominique Grange, Toulouse (FR)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/282,559

(22) Filed: Sep. 30, 2016

(65) Prior Publication Data
US 2018/0097392 A1    Apr. 5, 2018

(51) Int. Cl.
*H02J 7/00* (2006.01)
*H02J 7/02* (2016.01)
*H02J 50/10* (2016.01)
*H02J 50/60* (2016.01)

(52) U.S. Cl.
CPC .............. *H02J 7/025* (2013.01); *H02J 50/10* (2016.02); *H02J 50/60* (2016.02)

(58) Field of Classification Search
CPC .. H02J 7/025; H02J 50/12; H02J 50/90; H02J 50/10; H02J 50/80; H02J 7/0027; H02J 7/042; H02J 50/20; H02J 5/005; H02J 7/0021; H04B 5/0081; H04B 5/0075
USPC ........................................................ 320/108
See application file for complete search history.

(56) References Cited

U.S. PATENT DOCUMENTS

| | | | |
|---|---|---|---|
| 2009/0045913 A1* | 2/2009 | Nelson | G06K 7/0008 340/5.66 |
| 2013/0244578 A1* | 9/2013 | Bacioccola | H04M 1/72533 455/41.2 |
| 2015/0087228 A1* | 3/2015 | Porat | H04B 5/02 455/41.1 |
| 2015/0115879 A1* | 4/2015 | Park | H02J 7/025 320/108 |
| 2016/0065005 A1* | 3/2016 | Won | H04B 5/0037 307/104 |
| 2016/0322853 A1* | 11/2016 | Porat | H02J 50/12 |

* cited by examiner

*Primary Examiner* — Nghia M Doan
(74) *Attorney, Agent, or Firm* — Spectrum IP Law Group LLC

(57) ABSTRACT

The disclosure relates to a method, apparatus and system to wirelessly charge a device without creating fire hazard or other risks to nearby sensitive objects. An exemplary embodiment includes a memory circuitry and a chipset. The chipset communicates with the memory circuitry and is configured to selectively communicate with one of a wireless charging module and an NFC module to detect presence of the sensitive device. The chipset can be further configured to: transmit a first polling signal at a first power level for a first duration and detect a response from the sensitive device; if no response is detected during the first duration, transmit a second polling signal at a second power level for a second duration; cease polling signal transmission if response is received to either the first or the second polling signals; and engage the wireless charging module to charge the proximally located wireless device if no response is detected from the sensitive device during the first or the second duration.

29 Claims, 6 Drawing Sheets

SYSTEM, METHOD AND APPARATUS FOR SAFE A4WP POLLING

BACKGROUND

Field

The disclosure relates to wireless charging stations. Specifically, the disclosure relates to a method, apparatus and system to wirelessly charge a device without creating fire hazard or other risks to nearby sensitive objects.

Description of Related Art

Wireless charging or inductive charging uses a magnetic field to transfer energy between two devices. Wireless charging can be implemented at a charging station. Energy is sent from one device to another device through an inductive coupling. The inductive coupling is used to charge batteries or run the receiving device. The Alliance for Wireless Power (A4WP) was formed to create industry standard to deliver power through non-radiative, near field, magnetic resonance from the Power Transmitting Unit (PTU) to a Power Receiving Unit (PRU).

The A4WP defines five categories of PRU parameterized by the maximum power delivered out of the PRU resonator. Category 1 is directed to lower power applications (e.g., Bluetooth headsets). Category 2 is directed to devices with power output of about 3.5 W and Category 3 devices have an output of about 6.5 W. Categories 4 and 5 are directed to higher-power applications (e.g., tablets, netbooks and laptops). This category may be extended to automotive and drones in future.

PTUs of A4WP use an induction coil to generate a magnetic field from within a charging base station, and a second induction coil in the PRU (i.e., portable device) takes power from the magnetic field and converts the power back into electrical current to charge the battery. In this manner, the two proximal induction coils form an electrical transformer. Greater distances between sender and receiver coils can be achieved when the inductive charging system uses magnetic resonance coupling. Magnetic resonance coupling is the near field wireless transmission of electromagnetic energy between two coils that are tuned to resonate at the same frequency.

Currently wireless charging is particularly important for fast charging of devices including smartphones, tablets and laptops. The use of wireless charging may be extended to cars and drones in a close future. There is a need for improved wireless charging systems to extend the active charging area and to improve coupling and charging uniformity while avoiding disruption of nearby devices that may be damaged by the generated magnetic field.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Figure 1:
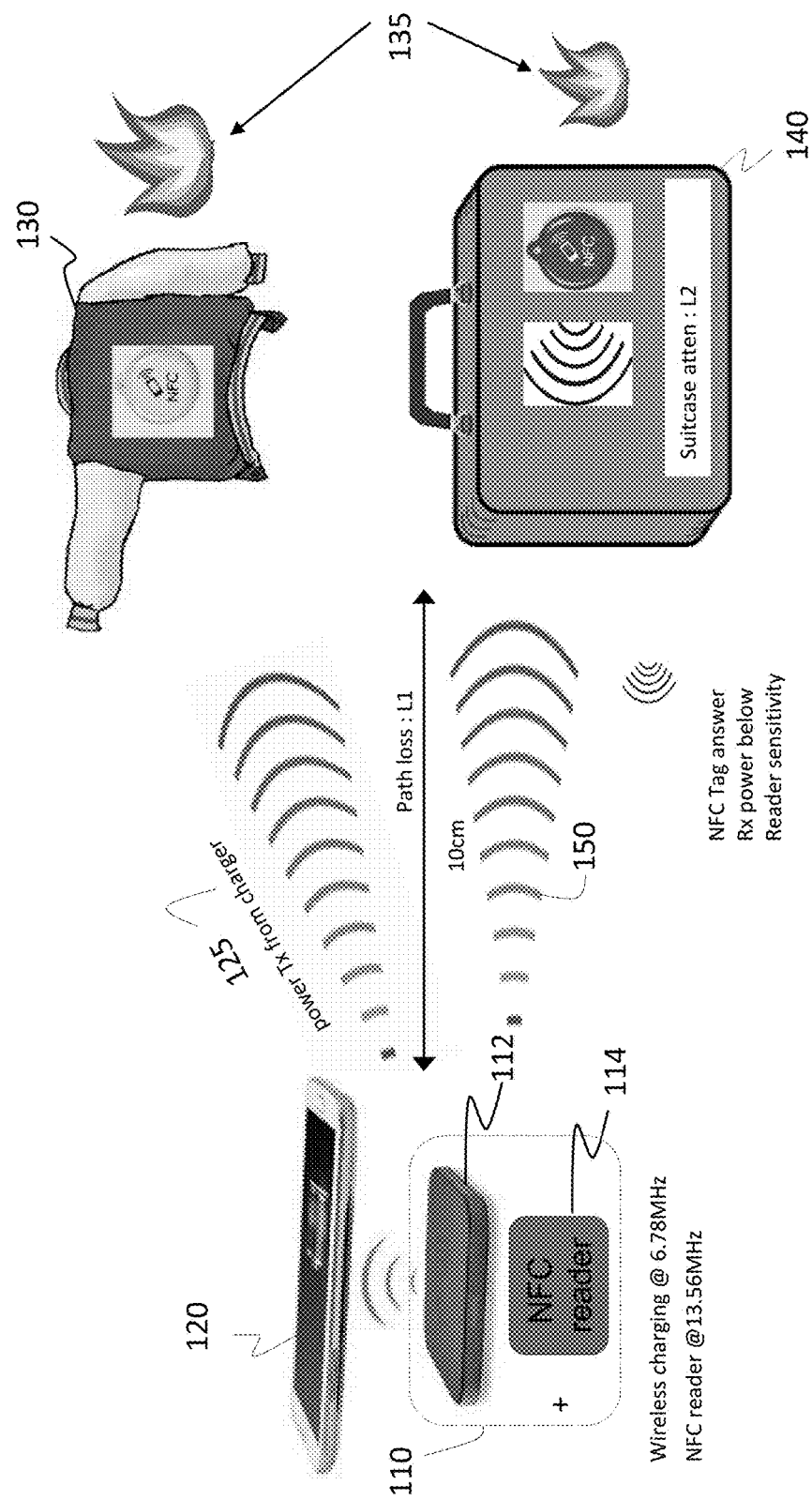
FIG. 1 schematically illustrates the problem caused by the conventional A4WP charger and nearby NFC tags.

Certain embodiments may be used in conjunction with various devices and systems, for example, a mobile phone, a smartphone, a laptop computer, a sensor device, a Bluetooth (BT) device, an Ultrabook™, a notebook computer, a tablet computer, a handheld device, a Personal Digital Assistant (PDA) device, a handheld PDA device, an on board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AV) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Institute of Electrical and Electronics Engineers (IEEE) standards (IEEE 802.11-2012, IEEE Standard for Information technology-Telecommunications and information exchange between systems Local and metropolitan area networks—Specific requirements Part 11: Wireless LAN Medium Access Control (MAC) and Physical Layer (PHY) Specifications, Mar. 29, 2012; IEEE 802.11 task group ac (TGac) ("IEEE 802.11-09/0308r12—TGac Channel Model Addendum Document"); IEEE 802.11 task group ad (TGad) (IEEE 802.11ad-2012, IEEE Standard for Information Technology and brought to market under the WiGig brand—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing Wireless HDTM specifications and/or future versions and/or derivatives thereof, units and/or devices which are part of the above networks, and the like.

Some embodiments may be implemented in conjunction with the BT and/or Bluetooth low energy (BLE) standard. As briefly discussed, BT and BLE are wireless technology standard for exchanging data over short distances using short-wavelength UHF radio waves in the industrial, scientific and medical (ISM) radio bands (i.e., bands from 2400-2483.5 MHz). BT connects fixed and mobile devices by building personal area networks (PANs). Bluetooth uses frequency-hopping spread spectrum. The transmitted data are divided into packets and each packet is transmitted on one of the 79 designated BT channels. Each channel has a bandwidth of 1 MHz. A recently developed BT implementation, Bluetooth 4.0, uses 2 MHz spacing which allows for 40 channels.

Some embodiments may be used in conjunction with one way and/or two-way radio communication systems, a BT device, a BLE device, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like. Some demonstrative embodiments may be used in conjunction with a WLAN. Other embodiments may be used in conjunction with any other suitable wireless communication network, for example, a wireless area network, a "piconet", a WPAN, a WVAN and the like.

Electromagnetic induction based Wireless charging and Near Field Communication (NFC) are two technologies that are based on inductive coupling between two coils. Wireless charging based on A4WP is using 6.78 MHz industrial, scientific or medical (ISM) frequency band to deliver power between wireless charger and device, while NFC (and some other RFID technologies) is using 13.56 MHz ISM frequency band to deliver power and data between devices.

Conventional A4WP standard uses lost-power calculation to determine if a rogue or foreign object or device is at or near the magnetic charging field. The conventional methods conduct the lost-power calculation in the following manner. A wireless power charger knows the output power of its PTU coil. A PRU under charge communicates back to the PTU charger as to how much power it has received during a given period. If the received power is smaller than the transmit power, then some of the power has been lost. If the lost power is large enough (e.g., larger than a pre-defined threshold), then the charger will conclude that a rogue object is positioned at or near the charging pad. When a rogue object is detected, the power transfer will cease and the wireless charging system will revert to its latching fault (off) state.

For example, when an NFC tag is placed at about 10 cm from an A4WP wireless charger, the NFC tag may catch fire after about forty seconds of exposure to the wireless charging currents. While the NFC ecosystem is too established to modify, the A4WP chargers may be modified to prevent such unintended consequences. In certain exemplary embodiments, the disclosure modifies operation of the PTU to detect an NFC tag proximal to the charging area.

Conventional lost-power algorithms are not able to detect small NFC devices (or RFID) including NFC stickers. This is due to the fact that such devices are designed to effectively capture magnetic field. Such devices heat up and are damaged with low amounts of power which is well below the lost-power detection threshold of conventional wireless chargers. Consequently, NFC and RFID devices may be damaged by the A4WP charging magnetic fields.

To overcome these and other shortcomings of the conventional wireless charging systems, certain embodiments of the disclosure provide a wireless charging system to detect presence of sensitive devices (e.g., NFC-compatible devices and RFID). In one embodiment, the disclosure provides an algorithm to identify presence of a device prone to damage by wireless charging. While the disclosed principles are illustrated in relation to A4WP standards, they are not limited thereto and may be equally applied to other wireless charging systems.

The disclosed embodiments are particularly advantageous because a wireless charger may readily detect presence or entry of a sensitive device (e.g., NFC or RFID) into the wireless charger's magnetic field. The wireless charger may then decide whether to enter into wireless power transfer mode. The disclosed embodiments are particularly suitable for small devices whose presence may be undetectable to the conventional lost-power calculation techniques. The disclosed embodiments also enable ramping up power smoothly to avoid NFC tag burnout because the PTU sends just enough power while being sensitive to detect a tag's presence even if it is placed in a suitcase or clothing pocket.

FIG. 1 schematically illustrates the problem caused by the conventional A4WP charger and nearby NFC tags. In FIG. 1, PTU 112 and NFC 114 reader are cumulatively shown as unit 110. Wireless charger 112 may be an A4WP charger. Unit 110 can provide wireless charging at a frequency of about 6.78 MHz while providing NFC sending and reading functionality at a frequency of about 13.56 MHz.

Mobile device 120 may be positioned proximal to unit 110 for wireless charging. FIG. 1 also shows NFC tags 130 and 140. NFC tag 130 is positioned inside a jacket. NFC tag 130 may be, for example, a theft deterrent tag associated with a clothing article. A common situation is placement of an NFC reader card (e.g., tag) inside a pocket which heats up if the carrier is close to an active PTU. NFC tag 140 may be inside a suitcase. During transfer phase in which smart phone 120 is being charged, the PTU generates a 6.78 MHz signal and harmonics because the system is nonlinear. The second harmonics (i.e., 2×6.78 MHz=13.56 MHz) corresponds to the fundamental of the NFC carrier. If the wireless charger's transmission power 125 is strong enough and if the distance between charger 112 and either NFC tag is less than about 10 cm, the tags antenna will receive A4WP's second harmonics and generate current. According to Joule's law the current can heat up and start fire after about 40 seconds as shown by arrows 135. Further, any NFC response to inquiry polls emitted from NFC tags 130 and 140 may be attenuated due to physical barriers. Thus, NFC reader 114 may not recognize the tags' presence.

The time required to detect presence of an NFC tag is less than about 200 ms. Thus, it is important to detect the tags' presence even if clothing or other material attenuate the tag's response to the polling signal during this short period. Beyond this time, the tag may heat up and catch fire.

In certain embodiments of the disclosure, NFC signal power is progressively increased and delivered at 13.78 MHz frequency. For example, the polling signal may be powered in increasing increments (e.g., steps or levels) during regular intervals. In one embodiment, the polling signal power is supplied in an increasing stepwise manner in 5 steps with each step having a finite duration. The detection power may be incrementally increased from about 20 dBm (0.1 Watt) to about 43 dBm (20 Watts) for a total of 1 second. When tags are polled, the distance between the PTU and the tag may be unknown. If the tag is too close and the signal power is supplied at a maximum level (i.e., 43 dBm), the tag's front end may quickly become saturated and destroyed. In contrast, progressively increasing the polling signal's power enables safely finding a proximal tag without destroying the tag or creating a fire hazard. Further, each incremental power step can have a designated duration. The duration can be selected to accommodate receiving a response to the polling signal. In one embodiment of the disclosure, the duration can be about 200 msec. This duration may be constant or variable. The front-end of the NFC detector can be selected to be sensitive to attenuated poll response signals (e.g., about −100 dBm). Once a proximal tag is detected, additional polling will be unnecessary and charging may cease. If a tag is not detected, the power transfer mode at 6.78 MHz may be commenced or resumed. The polling and charging process may be repeated at set intervals. The device need only switch transfer mode between set frequencies of 6.78 MHz (charging) and 13.56 MHz (polling).

Figure 2:
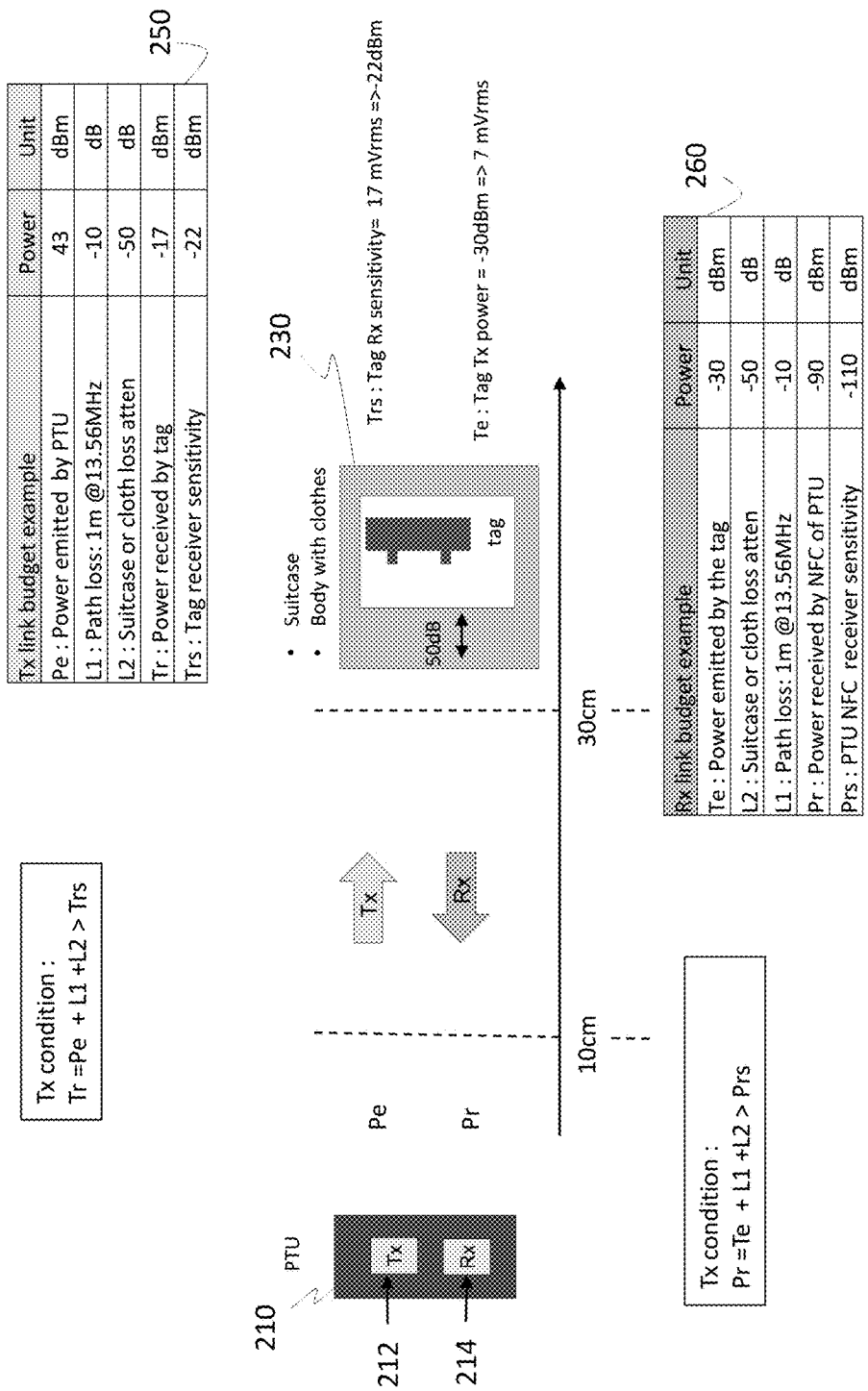
FIG. 2 illustrates an exemplary implementation according to one embodiment of the disclosure.

FIG. 2 illustrates an exemplary implementation according to one embodiment of the disclosure. PTU 210 of FIG. 2 is shown with transmitter 212 and receiver 214. While not shown, PTU 210 may include transmission antenna, controller and other circuitries necessary for implementing the disclosed embodiments. Object 230 may be located at a distance from PTU 210. Object 230 may include a suitcase with an NFC tag inside or a tagged clothing item on a body. A conventional tag has receiving sensitivity of about 17 Vrms which equates to about −22 bBm power. The conventional tag has a transmission power of about −30 dBm, which is about 7 mVrms. As shown by arrows 240, movement of object 230 towards or away from PTU 210 will determine whether the NFC tag is close enough to cause a potential hazard.

Table 250 demonstrates an exemplary polling signal budget for transmitter 212. As shown, PTU 210 has charger transmit power of about 43 dBm. At 1 m distance and at transmission frequency of 13.56 MHz, path loss calculates to about −10 dB. Signal attenuation due to suitcase and/or clothing is estimated at about −50 dB. Thus, the total received power at the tag is about −17 dBm.

Table 260 demonstrates an exemplary receiver link budget for receiver 214. Here, the NFC tag's maximum transmit power is about −30 dBm. At 1 m distance and at 13.56 MHz frequency, the path loss is about −10 dB. Signal attenuation due to clothing and other objects is about −50 dB. Thus, the wireless charger's received power is about −94 dBm. In other words, receiver 214 of PTU 210 must have at least −100 dBm sensitivity to identify the −94 dBm signal transmitted from tag 230.

Figure 3:
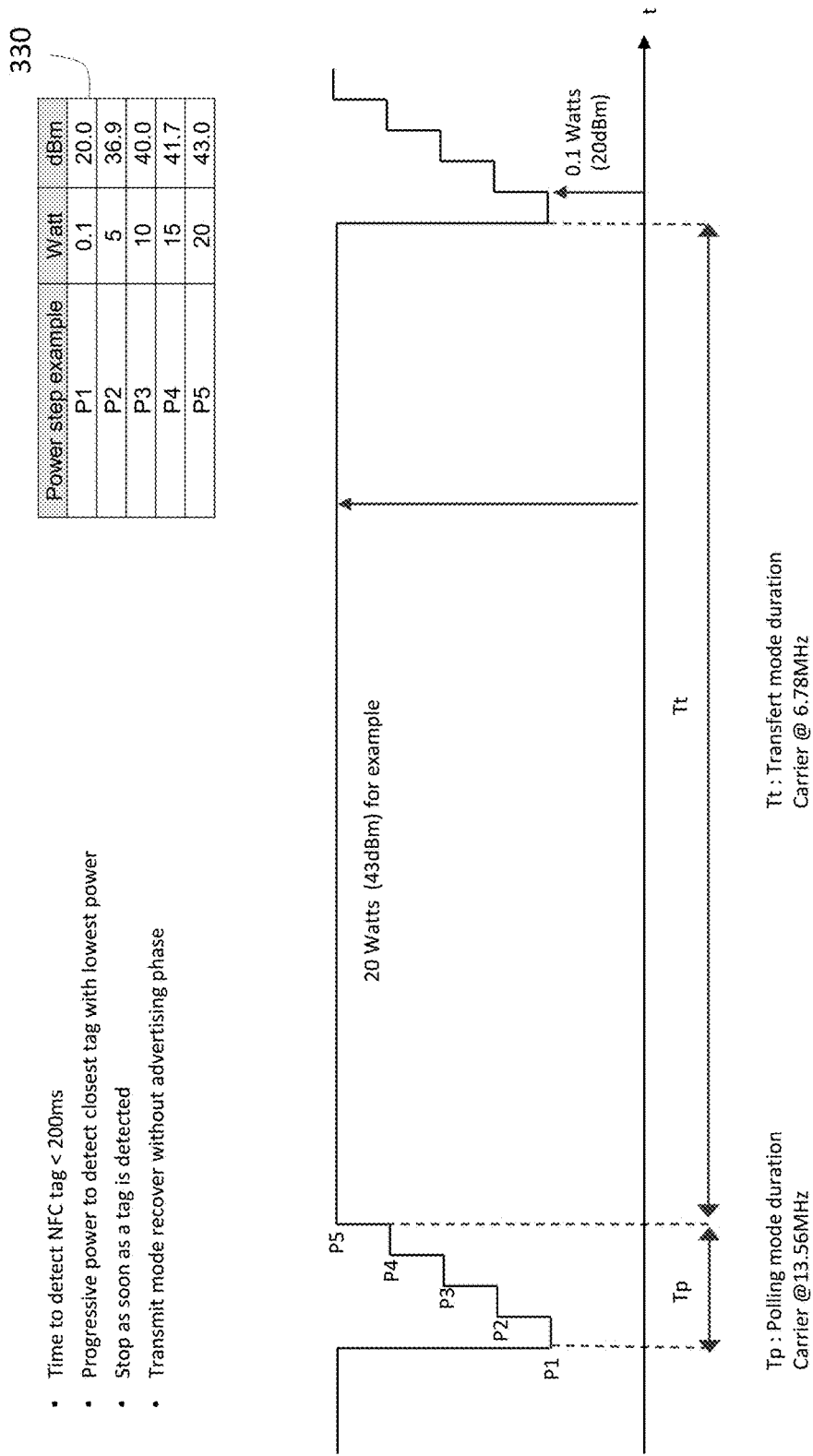
FIG. 3 illustrates a polling power management technique according to one embodiment of the disclosure.

FIG. 3 illustrates a polling power management technique according to one embodiment of the disclosure. Specifically, FIG. 3 shows the power of a polling signal transmitted by an exemplary PTU (e.g., transmitter 214, FIG. 2). The carrier frequency is set to 13.56 MHz for the polling mode. Initially, the signal power is at a maximum of 20 Watts, which is about 43 dBm. At step 1, the power is reduced to about 0.1 watt (20 dBm). The polling signal power is maintained at 0.1 Watt for about 200 msec (duration needed to detect a response). If a response is not received during this time, at step 2 the transmission power of the polling signal is incrementally increased to about 5 Watt (36.9 dBm) for a duration of about 200 msec. If a response is not received during this time, at step 3 the transmission power of the polling signal is incrementally increased to about 10 Watt (40 dBm). This transmission power is maintained for about 200 msec. If a response is not received during this time, at step 4 the transmission power of the polling signal is incrementally increased to about 15 Watt (41.7 dBm) for a duration of about 200 msec. If a response is still not received, it is assumed that a tag is not proximal to the PTU and the transmission power can be resumed at 20 Watt (43 dBm). These steps are summarized at table 330 of FIG. 3.

As shown in FIG. 3, steps 1-5 cumulatively take about one second. In one embodiment, the maximum power transmission (43 dBm) is maintained for the subsequent 9 seconds before the step-wise polling is resumed. It should be noted that the step-wise transmission duration of about 200 msec can be increased or decreased at each step according to the desired outcome or based on other needs. In the embodiment of FIG. 3, the polling mode lasts about one second and there are five power steps, which leads to a polling duration of about 200 msec for each step. By progressively increasing the polling signal power, a proximal tag may be detected at the lowest detectable transmission power without damaging the tag. Once a tag is detected, polling can be stopped. If a proximal tag is not detected, transmit mode resumes after one second.

Figure 4:
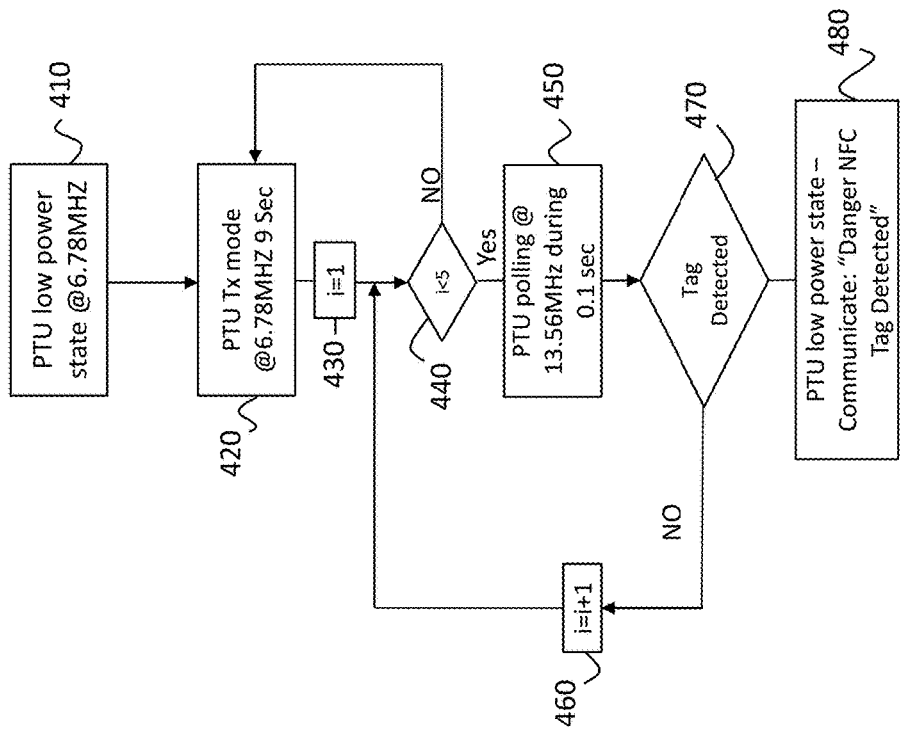
FIG. 4 shows a flowchart for an exemplary state machine according to one embodiment of the disclosure.

FIG. 4 shows a flowchart for an exemplary state machine according to one embodiment of the disclosure. More specifically, FIG. 4 shows an exemplary state machine for NFC polling. The state machine of FIG. 4 may be implemented in hardware, software or a combination of hardware and software. Among others, the algorithm of FIG. 4 may be implemented at a controller, a processor circuitry or a chipset. The process of FIG. 4 starts at steps 410 with the PTU at low power state of, for example, 6.78 MHz. At step 420 the PTU enters transfer mode at 6.78 MHz. The PTU power transfer mode may be maintained for about 9 second as described in relation to FIG. 3. After the predetermined duration of the power transfer mode, the algorithm enters the first step value by setting i equal to 1 as shown at step 430. The number of steps may be predetermined and set according to the desired outcome. In the embodiment of FIG. 4, the total number of steps is set to 5. The total number of steps and the power level of each step may be varied according to each application.

At step 440, the algorithm determines if the current step value (i) is less than the predetermined total number of steps or levels. If the current step is less than the maximum number of levels, then the algorithm proceeds to step 450 where PTU polling at 13.56 MHz commences. The polling duration can be, for example, 0.1 sec. At step 470, the NFC reader (e.g., reader 114, FIG. 1) identifies whether a tag is detected by seeking a response to the NFC poll. If a tag is not detected, the step value (i) is increased by one at step 460 and the algorithm returns to step 440. If a tag is detected at step 470, the PTU enters a low power state at step 480. In addition, the PTU may communicate a message to the user to acknowledge presences of a tag. The message may be printed or displayed for the user's benefit. In an exemplary implementation, the PTU may sound an audible alarm to notify the user.

Figure 5:
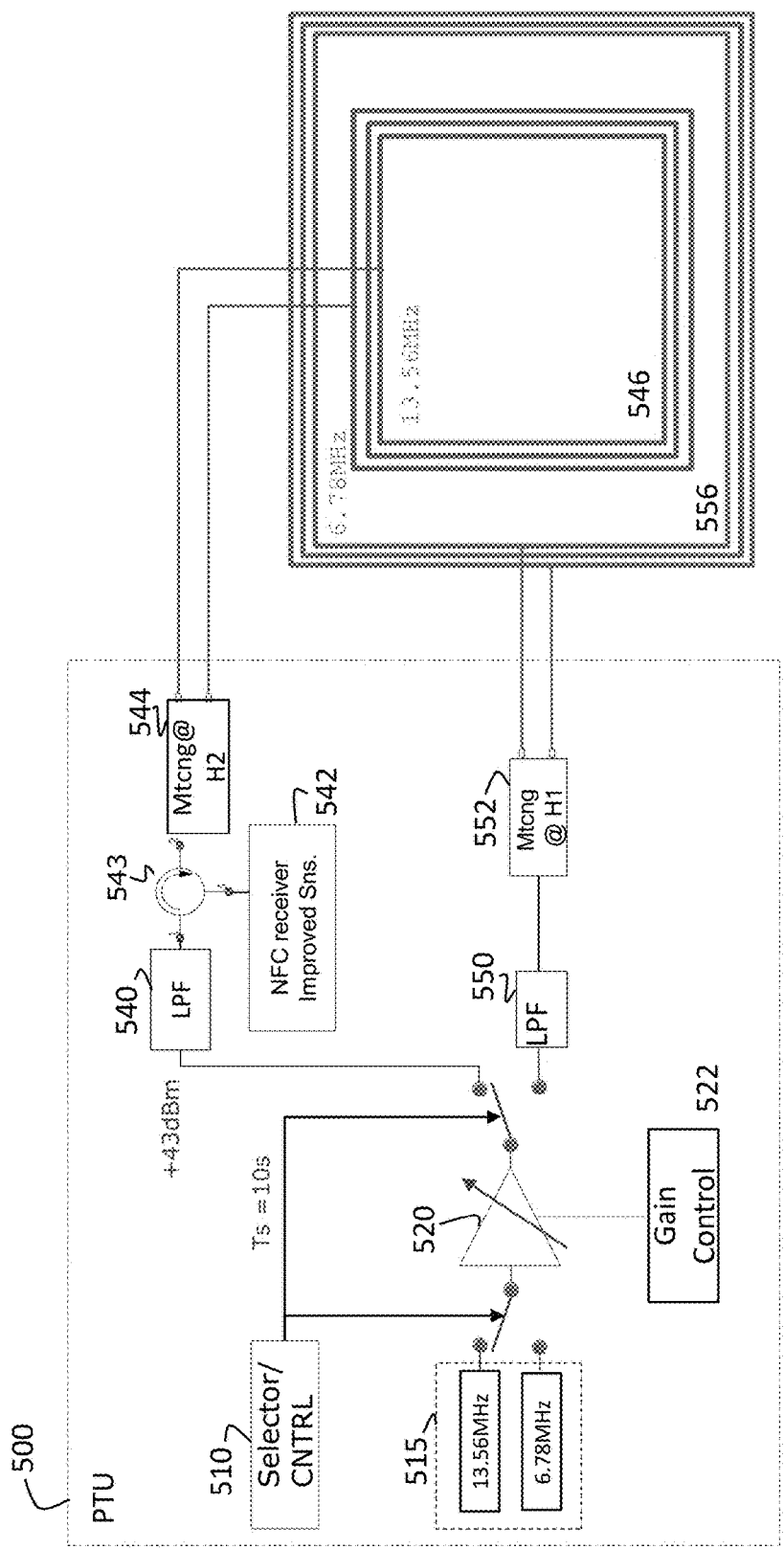
FIG. 5 is a schematic representation of an exemplary system according to a first exemplary embodiment of the disclosure.

FIG. 5 is a schematic representation of an exemplary system according to a first exemplary embodiment of the disclosure. Specifically, FIG. 5 shows PTU 500 along with antennas 546 and 556, the entirety of which may be integrated into a single charging device or may be part of a large communication and charging station. PTU 500 includes controller 510, power amplifier (PA) 520, gain control 522, frequency generators 515, low pass filters 540 and 550, NFC receiver circuitry 542 and harmonics matching circuits 552 and 544.

During operation, controller 510 determines the input frequency to PA 520. Controller 510 may be implemented in hardware, software or a combination of hardware and software. In one embodiment, controller 510 includes a register or a selector circuitry. The input to power amplifier 520 may include one of 13.56 MHz or 6.78 MHz carrier frequencies in addition to the gain control 522. Controller 510 may be configured to switch between these frequencies during various intervals. In the exemplary embodiment of FIG. 5, the switching period ($T_s$) is set for 10 seconds.

In transmit mode, when frequency of 13.56 MHz is selected, the output of power amplifier 520 is directed to low pass filter (LPF) 540. The filtered signal is then directed to circuitry 544. Circuitry 544 is a matching circuit to match the output signal of LPF 540 to the second harmonics of the 13.56 frequency. Matching circuit 544 removes second harmonics from the signal. The signal is then transmitted as a polling signal through antenna 546 at 13.56 MHz.

In receive mode, switch 543 connects antenna 546 to NFC receiver 542. Thus, switch 543 acts as NFC half duplex connection circuitry. In one embodiment, receiver 542 may have improved sensitivity to detect signals as low as −110 dBm. If a nearby tag is detected, controller 510 of PTU 500 may take the necessary steps to notify the user and/or change operating parameters to avoid potential risk.

When operating at 6.78 MHz frequency, controller 510 switches input to power amplifier 520 to set frequency to 6.78 MHz. The power amplifier output is directed to LPF 550 and to antenna 556 through matching circuitry 552. Matching circuitry 552 operates at 6.78 MHz. In the exemplary embodiment of FIG. 5, controller 510 may be configured to cycle through frequencies 13.56 and 6.78 MHz every 10 seconds. In one embodiment, controller 510 may elect to selectively operate PTU 500 at 13.56 MHz for one second followed by none seconds of operation at 6.78 MHz.

Figure 6:
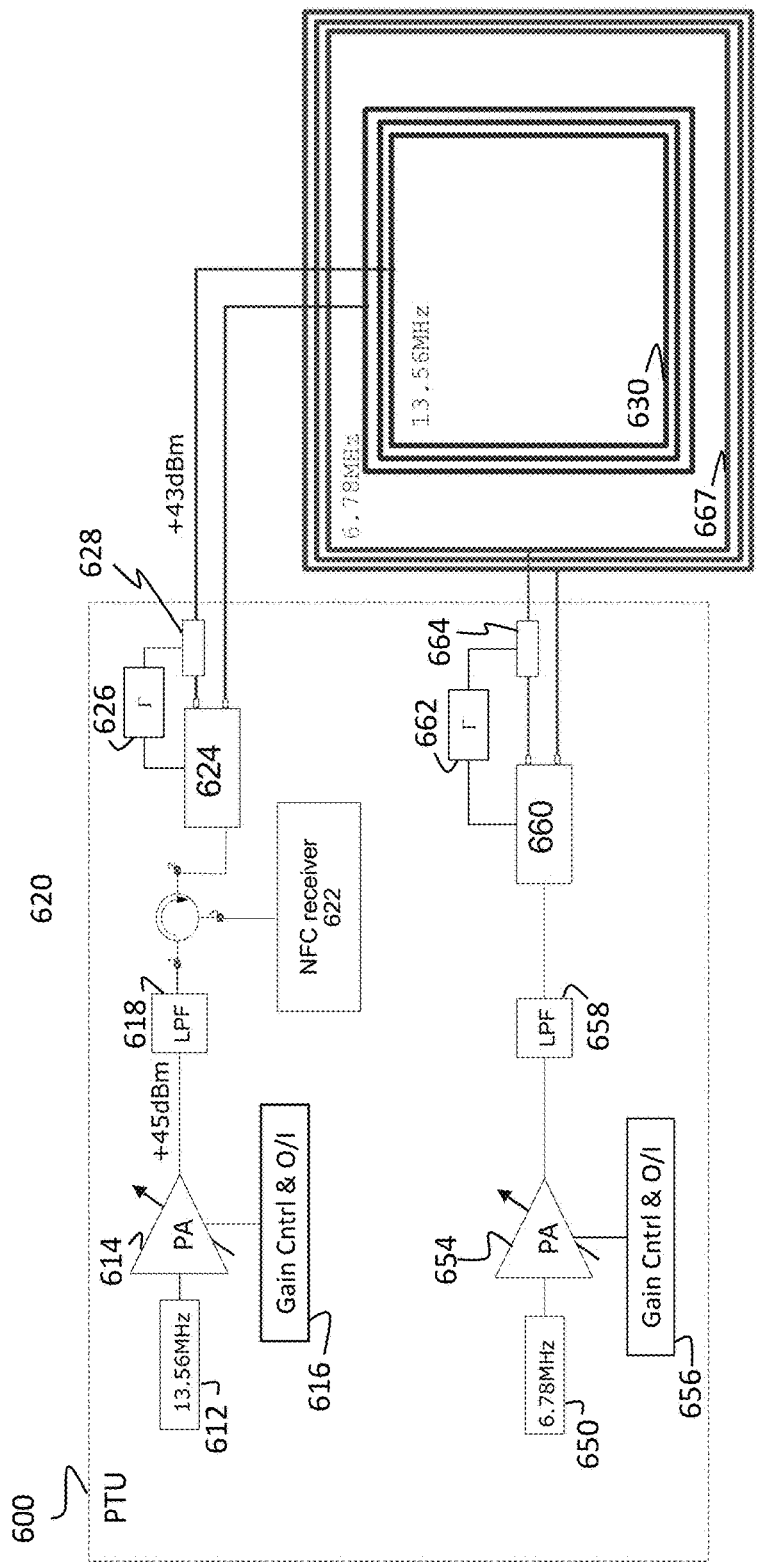
FIG. 6 is a schematic representation of a system according to a second exemplary embodiment of the disclosure.

FIG. 6 is a schematic representation of a system according to a second exemplary embodiment of the disclosure. Here, each of the 13.56 MHz and 6.78 MHz channel is provided its own power amplifier. PTU 600 of FIG. 6 includes waveform generators 612 and 650 providing, respectively, waveforms of 13.56 MHz and 6.78 MHz frequency. A controller (not shown) can selectively switch between the two channels. At NFC operating mode, a 13.56 MHz frequency waveform is provided to PA 614. Gain control circuitry 616 provides the needed input power to PA 614. Gain control circuitry 616 may further be configured to act as on/off switch to turn off PA 614 during non-operating times. The output of PA 614 is processed through LPF 618. When operating in transmit mode, switch 620 directs the incoming signal to antenna 630 for transmission as a polling signal. This signal is processed through matching circuit 624 which removes second harmonics at H2 frequency. Circuits 626 and 628 are part of the feedback loop for removing unwanted harmonics.

In receive mode, antenna 630 receives a polling response signal and directs the received signal to the NFC receiver 622. The NFC receiver 622 may be configured to provide improved sensitivity to about −110 dBm. Should a response to polling signal indicate presence of a nearby tag, the controller (not shown) may take the necessary steps to power down or turn off PTU 600 to avoid risk of damage.

As stated, PTU 600 may also operate at 6.78 MHz frequency to charge a nearby device. In this mode, waveform generator 650 provides an input signal to PA 654. Power amplifier 654 may also receive an input signal from gain control circuitry 656. Gain control 656 may also act as an ON/Off switch to reduce signal leakage. The output of PA 654 is processed through LPF 658 and matching circuitry 660 before transmitted by antenna 667. Matching circuit 660 removes second harmonics at H1 frequency. Circuits 662 and 664 are part of the feedback loop for removing unwanted harmonics.

While FIGS. 5 and 6 illustrate the front-end of the PTU unit separately from the two antennas, it is noted that the antennas may be combined with the PTU to provide an integrated unit.

The following non-limiting examples are provided to further illustrates the disclosed principles. Example 1 is directed to a wireless charging device to identify a proximal sensitive device, comprising: a memory circuitry; a chipset to communicate with the memory circuitry, the chipset configured to communicate with one of a wireless charging module and a Near-field Communication (NFC) module to detect presence of the sensitive device, the chipset further configured to: transmit a first polling signal at a first power level for a first duration and detect a response from the sensitive device; if no response is detected during the first duration, transmit a second polling signal at a second power level for a second duration; cease polling signal transmission if response is received to either the first or the second polling signals; and engage the wireless charging module to charge the proximally located wireless device if no response is detected from the sensitive device during the first or the second duration.

Example 2 is directed to the device of example 1, further comprising incrementally increasing the second power level to each of a plurality of subsequent power levels and transmitting a plurality of subsequent polling signals at each of the respective subsequent power levels if no response is detected to the polling signal of a prior power level.

Example 3 is directed to the device of example 2, wherein each of the plurality of subsequent polling signals is transmitted for a respective transmission duration.

Example 4 is directed to the device of example 3, wherein each of the respective transmission durations is substantially equal.

Example 5 is directed to the device of example 3, wherein the respective transmission durations are different.

Example 6 is directed to the device of example 2, further comprising ceasing polling transmission if a polling response is received to any one of the plurality of subsequent polling signals.

Example 7 is directed to the device of example 1, further comprising engaging the NFC module and disengaging the wireless charging module prior to transmitting the polling signal at the first power level.

Example 8 is directed to a wireless charging system, comprising: a wireless charging module having a wireless charging antenna to provide A4WP charging to a proximally located wireless device; an NFC module having a Near-field Communication (NFC) antenna to transmit one or more NFC polling signals and receive a polling response signal; a controller circuitry to selectively communicate with one of the wireless charging module and the NFC module to detect presence of a sensitive device near the wireless charging module, the controller circuitry configured to: transmit a first polling signal at a first power level for a first duration and detect a response from the sensitive device; if no response is detected during the first duration, transmit a second polling signal at a second power level for a second duration; cease polling signal transmission if response is received to either the first or the second polling signals; and engage the wireless charging module to charge the proximally located wireless device if no response is detected from the sensitive device during the first or the second duration.

Example 9 is directed to the system of example 8, further comprising incrementally increasing the second power level to each of a plurality of subsequent power levels and transmitting a plurality of subsequent polling signals at each of the respective subsequent power levels if no response is detected to the polling signal of a prior power level.

Example 10 is directed to the system of example 9, wherein each of the plurality of subsequent polling signals is transmitted for a respective transmission duration.

Example 11 is directed to the system of example 10, wherein each of the respective transmission durations is substantially equal.

Example 12 is directed to the system of example 10, wherein the respective transmission durations are different.

Example 13 is directed to the system of example 9, further comprising ceasing polling transmission if a polling response is received to any one of the plurality of subsequent polling signals.

Example 14 is directed to the system of example 8, further comprising engaging the NFC module and disengaging the wireless charging module prior to transmitting the polling signal at the first power level.

Example 15 is directed to a method to identify presence of a sensitive device near a wireless charging station, the method comprising: transmitting a first polling signal at a first power level for a first duration and detecting a response from the sensitive device; if no response is detected from the sensitive device during the first duration, transmitting a second polling signal at a second power level for a second duration; ceasing polling signal transmission if response signal is received to either the first or the second polling signals; and starting wireless charging if no response is detected from the sensitive device during the first or the second durations.

Example 16 is directed to the method of example 15, wherein the polling signal is a Nearfield-Communication Signal and wherein the electromagnetic power transmission is conducted pursuant to A4WP Standard.

Example 17 is directed to the method of example 15, further comprising incrementally increasing the second power level to a plurality of subsequent power levels and transmitting a plurality of subsequent polling signals at each of the respective subsequent power levels if no response is detected to the polling signal of a prior power level.

Example 18 is directed to the method of example 17, wherein each of the plurality of subsequent polling signals is transmitted for a respective transmission duration.

Example 19 is directed to the method of example 18, wherein each of the respective transmission durations is substantially equal.

Example 20 is directed to the method of example 18, wherein the respective transmission durations are different.

Example 21 is directed to the method of example 17, further comprising ceasing polling transmission if a polling response is received to any one of the plurality of subsequent polling signals.

Example 22 is directed to the method of example 15, further comprising engaging an NFC communication module and disengaging a power transmission module prior to transmitting the polling signal at the first power level.

Example 23 is directed to a non-transitory machine-readable medium comprising instructions executable on a processor circuitry to identify presence of a sensitive device near a wireless charging station, the instructions causing the processor circuitry to: transmit a first polling signal at a first power level for a first duration and detect a response from the sensitive device; if no response is detected from the sensitive device during the first duration, transmit a second polling signal at a second power level for a second duration; cease polling signal transmission if response signal is received to either the first or the second polling signals; and start a wireless charging process if no response is detected from the sensitive device during the first or the second duration.

Example 24 is directed to the medium of example 23, wherein the polling signal is a Nearfield-Communication Signal and wherein the electromagnetic power transmission is conducted pursuant to A4WP Standard.

Example 25 is directed to the medium of example 23, wherein the instructions further include incrementally increasing the second power level to a plurality of subsequent power levels and transmitting a plurality of subsequent polling signals at each of the respective subsequent power levels if no response is detected to the polling signal of a prior power level.

Example 26 is directed to the medium of example 25, wherein each of the plurality of subsequent polling signals is transmitted for a respective transmission duration.

Example 27 is directed to the medium of example 26, wherein each of the respective transmission durations is substantially equal.

Example 28 is directed to the medium of example 26, wherein the respective transmission durations are different.

Example 29 is directed to the medium of example 25, wherein the instructions further include end polling transmission if a polling response is received to any one of the plurality of subsequent polling signals.

Example 30 is directed to the medium of example 23, wherein the instructions further include engage an NFC communication module and disengage a power transmission module prior to transmitting the polling signal at the first power level.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

While the principles of the disclosure have been illustrated in relation to the exemplary embodiments shown herein, the principles of the disclosure are not limited thereto and include any modification, variation or permutation thereof.

What is claimed is:

1. A wireless charging device to identify a proximal sensitive device, comprising:
 a memory circuitry;
 a chipset to communicate with the memory circuitry, the chipset configured to communicate with one of a wireless charging module and a Near-field Communication (NFC) module to detect presence of the proximal sensitive device, the chipset further configured to:
  transmit a first polling signal at a first power level for a first duration;

detect a response to the first polling signal from the proximal sensitive device during the first duration;

transmit a second polling signal at a second power level for a second duration if a response to the first polling signal is detected;

detect a response to the second polling signal from the proximal sensitive device during the second duration;

engage the wireless charging module to charge a proximally located wireless device after no response is detected during the first or the second duration;

wherein the second power level is greater than the first power level.

2. The device of claim 1, wherein the chipset is configured to increase the second power level to a third power level and transmit a third polling signals when no response is detected during the first or the second duration.

3. The device of claim 2, wherein the third polling signals is transmitted for a third duration.

4. The device of claim 3, wherein the first, second and third durations are substantially equal.

5. The device of claim 3, wherein the first, second and third durations are different.

6. The device of claim 2, wherein the chipset is further configured to cease polling transmission upon receipt of a response during the first or the second duration.

7. The device of claim 1, wherein the chipset is further configured to engage the NFC module and disengage the wireless charging module prior to transmitting the polling signal at the first power level.

8. A wireless charging system, comprising:
a wireless charging module having a wireless charging antenna to provide A4WP charging to a proximally located wireless device;
an NFC module having a Near-field Communication (NFC) antenna to transmit one or more NFC polling signals and receive a polling response signal;
a controller circuitry to selectively communicate with one of the wireless charging module and the NFC module to detect presence of a sensitive device near the wireless charging module, the controller circuitry configured to:
transmit a first polling signal at a first power level for a first duration and detect a response from the sensitive device;
transmit a second polling signal at a second power level for a second duration if a response to the first polling signal is detected; and
cease polling signal transmission upon receiving a response to either the first or the second polling signals;
wherein the second power level is greater than the first power level.

9. The system of claim 8, further comprising incrementally increasing the second power level to a third power level and transmitting a third poling signal when no response is detected to the first or the second polling signals.

10. The system of claim 9, wherein each of the first, second and third polling signals is transmitted for a different transmission duration.

11. The system of claim 10, wherein the first, second and third transmission durations are substantially equal.

12. The system of claim 9, further comprising engaging the wireless charging module to charge a proximally located wireless device upon detecting a polling response to one of the first, second or third polling signals.

13. The system of claim 8, further comprising engaging the NFC module and disengaging the wireless charging module prior to transmitting the polling signal at the first power level.

14. A method to identify presence of a sensitive device near a wireless charging station, the method comprising:
transmitting a first polling signal at a first power level for a first duration;
detecting a response from the sensitive device during the first duration;
transmitting a second polling signal at a second power level for a second duration if a response to the first polling signal is detected;
detecting a response to the second polling signal from the sensitive device during the second duration;
engaging wireless charging of a proximally located wireless device after no response is detected during the during the first or the second durations;
wherein the second power level is greater than the first power level.

15. The method of claim 14, wherein the polling signal is a Nearfield-Communication Signal and wherein the electromagnetic power transmission is conducted pursuant to A4WP Standard.

16. The method of claim 14, further comprising incrementally increasing the second power level to a plurality of subsequent power levels and transmitting a plurality of subsequent polling signals at each of the respective subsequent power levels if no response is detected to the polling signal of a prior power level.

17. The method of claim 16, wherein each of the plurality of subsequent polling signals is transmitted for a respective transmission duration.

18. The method of claim 17, wherein each of the respective transmission durations is substantially equal.

19. The method of claim 17, wherein the respective transmission durations are different.

20. The method of claim 16, further comprising ceasing polling transmission if a polling response is received to any one of the plurality of subsequent polling signals.

21. The method of claim 14, further comprising engaging an NFC communication module and disengaging a power transmission module prior to transmitting the polling signal at the first power level.

22. A non-transitory machine-readable medium comprising instructions executable on a processor circuitry to identify presence of a sensitive device near a wireless charging station, the instructions causing the processor circuitry to:
transmit a first polling signal at a first power level for a first duration;
detect a response to the first polling signal from the sensitive device during the first duration;
transmit a second polling signal at a second power level for a second duration if a response to the first polling signal is not received;
detect a response to the second polling signal from the sensitive device during the second duration;
start a wireless charging process to charge a wireless device after no response is detected during the first or the second duration;
wherein the second power level is greater than the first power level.

23. The medium of claim 22, wherein the polling signal is a Nearfield-Communication Signal and wherein the electromagnetic power transmission is conducted pursuant to A4WP Standard.

24. The medium of claim 22, wherein the instructions further include incrementally increasing the second power level to a plurality of subsequent power levels and transmitting a plurality of subsequent polling signals at each of the respective subsequent power levels if no response is detected to the polling signal of a prior power level.

25. The medium of claim 24, wherein each of the plurality of subsequent polling signals is transmitted for a respective transmission duration.

26. The medium of claim 25, wherein each of the respective transmission durations is substantially equal.

27. The medium of claim 25, wherein the respective transmission durations are different.

28. The medium of claim 24, wherein the instructions further include end polling transmission if a polling response is received to any one of the plurality of subsequent polling signals.

29. The medium of claim 22, wherein the instructions further include engage an NFC communication module and disengage a power transmission module prior to transmitting the polling signal at the first power level.

* * * * *